US006770311B2

(12) United States Patent
Alamian et al.

(10) Patent No.: US 6,770,311 B2
(45) Date of Patent: Aug. 3, 2004

(54) CAVIAR ALTERNATIVE AND METHOD OF MAKING SAME

(76) Inventors: Sarkis Alamian, 537 Spencer St., Glendale, CA (US) 91202; Gagik Gevorgyan, 6444 Tujunga Ave., #11, North Hollywood, CA (US) 91606

( * ) Notice: Subject to any disclaimer, the term of this patent is extended or adjusted under 35 U.S.C. 154(b) by 178 days.

(21) Appl. No.: 10/196,871

(22) Filed: Jul. 15, 2002

(65) Prior Publication Data

US 2003/0017246 A1 Jan. 23, 2003

Related U.S. Application Data

(60) Provisional application No. 60/306,181, filed on Jul. 17, 2001.

(51) Int. Cl.[7] ............................... A23J 3/04; A23J 3/06
(52) U.S. Cl. ...................... 426/98; 426/576; 426/577; 426/578; 426/643; 426/508; 426/519
(58) Field of Search ...................... 426/98, 576, 577, 426/578, 643, 508, 519

(56) References Cited

U.S. PATENT DOCUMENTS

| | | | | |
|---|---|---|---|---|
| 3,717,469 A | * | 2/1973 | Slonimsky et al. | 426/574 |
| 4,202,908 A | * | 5/1980 | Nesmeyanov et al. | 426/72 |
| 4,822,534 A | * | 4/1989 | Lencki et al. | 264/4.3 |
| 5,942,266 A | * | 8/1999 | Okamura et al. | 426/89 |
| 6,291,010 B1 | * | 9/2001 | Pivovarov et al. | 426/643 |
| 6,688,960 B2 | * | 2/2004 | Khatchatrian et al. | 452/110 |

* cited by examiner

Primary Examiner—N. Bhat
(74) Attorney, Agent, or Firm—John E. Wagner; Sam Bernardo

(57) ABSTRACT

A man-made caviar alternative, including granules having a gelled center in a syrup exhibiting the same organoleptic properties as caviar from sturgeon. The granules are made from a mixture of encapsulation material, salt, coloring agents and flavoring agents, and granules are formed having a size of between about 2 to 4 millimeters. The thus formed granules may be treated with firming agents, crisping agents, and antioxidants. The caviar syrup in which the granules reside is a mixture including flavoring agents, salt, and stabilizing agents.

60 Claims, No Drawings

CAVIAR ALTERNATIVE AND METHOD OF MAKING SAME

REFERENCE TO RELATED APPLICATION

This non-provisional patent application claims benefit of U.S. Provisional Patent Application Ser. No. 60/306,181, filed Jul. 17, 2001, and hereby claims the benefit of the embodiments therein and of the filing date thereof.

BACKGROUND OF THE INVENTION

Caviar is a popular, but rather expensive, delicacy which is often times made from the roe of sturgeon. Because of its high cost, caviar has traditionally been a food reserved mainly for the wealthy.

Unfortunately, the world's supply of sturgeon is being depleted, due primarily to over fishing, as well as the destruction of the sturgeon's natural habitat. Consequently, the future availability of caviar from sturgeon is uncertain; however, it seems almost certain that the price of such caviar will rise.

In light of the foregoing, many have attempted to develop an alternative dietary product similar to natural caviar. To date, these products have not been commercially successful for a variety of reasons, the most common being that these imitation products do not exhibit the same organoleptic properties, such as taste, appearance, and mouthfeel, as natural caviar. Replicating the organoleptic properties of natural caviar has proven to be difficult. For example, some imitation caviar products do not exhibit the same consistency as natural caviar or the same particle size or crispness as natural caviar. Further, some imitation caviar products are made from egg protein, a foodstuff, which is not acceptable to a large segment of the general public. Still further, problems in manufacturing non-natural caviar are frequent and include difficulty in consistently controlling the quality of the product. Lastly, many non-natural manufacturing processes are costly and are therefore not a realistic alternative to natural caviar.

It would be beneficial if a dietary man-made product could be developed which imitated the organoleptic properties of natural caviar. Such substitute or man-made caviar must be relatively easy and inexpensive to make and must maintain its organoleptic properties for extended periods of time when properly stored. It would also be beneficial if such a substitute caviar product were comprised of natural or healthy ingredients, thus increasing its appeal to a larger segment of the general public.

BRIEF SUMMARY OF THE INVENTION

The present invention provides a substitute or man-made caviar whose organoleptic properties approach that of natural caviar from sturgeon. The invention also provides for a method of producing imitation caviar where the product quality is easily controlled and the cost of manufacturing is not prohibitive.

The inventive caviar is comprised of granules having shell with a gelled center, derived from an aqueous mixture containing food grade encapsulation materials, such as water-soluble carrageenans or gelatin, food grade coloring agents similar to natural caviar, food grade flavoring, water or oil having a fish flavor, and food grade sodium chloride. Other ingredients, such as food grade stabilizers, vitamins, proteins, and antioxidants may also be made a part of the granules.

The above-described mixture is introduced in the form of droplets into a food grade oil, such as mineral, vegetable, or paraffin, the temperature of which, at least in its lower layers, is below the temperature at which the droplets congeal to form granules. The thus-formed granules have an outside shell or membrane similar in hardness and crispness to natural caviar from sturgeon with a gelled center.

The granules are washed with water to remove any excess oil. The washed granules are added to an aqueous food grade solution containing water-soluble stabilizers, water or oil flavoring having the taste of fish, and sodium chloride, which form the caviar binding medium or syrup. The thus-formed, man-made caviar and binding medium in which it exists, exhibits a similar taste, mouthfeel, smell, and look of natural caviar.

DETAILED DESCRIPTION

The alternative caviar of this invention is comprised of granules incorporated into a binding medium or syrup. The granules, like natural caviar, have an outside shell or membrane with a gelled center.

The granules are prepared from an aqueous solution, which includes:

between about 0.1 to 45.0 percent food grade encapsulator materials;

between about 0.1 and 45.0 percent food grade coloring agents or dyes;

between about 0.1 to 20.0 percent food grade flavoring oils or water;

up to about 5.0 percent food grade sodium chloride;

with the balance being water, enough to make 1 kilogram of simulated caviar. The granular solution is prepared in a suitably sized container with a mixer. The granules may also include between about 0.1 to 20.0 percent food grade nutrition enhancers.

The food grade encapsulator materials must also have the ability to form a shell or membrane. Said food grade encapsulator materials may include separately or in combination food grade gums, hydrocolloids, proteins, collagens, lipids, thickening agents, plasticizers, which include the following materials or substances: gelatin, fish gelatin, beef gelatin, pork gelatin, caseinates, pectins, carrageenans, alginates, chitosan hydrogel and chitin, konjac, curdlan, furcelleran, gellan gum, pullulan, polypropylene glycol alginate, agar-agar gum, xanthan gum, locust bean gum, mesquite gum, whey protein isolate and/or concentrate, soy protein isolate and/or concentrate, wheat gluten, galactomannans, milk proteins, cellulose and its derivatives including: bacterial and microcrystalline, cellulose xyloglucan, B-glucan, albumin, edible biopolymers, emulsifying biopolymers. The encapsulator material must be stable at temperatures between about −10° to 80° C. and must be light stable. The preferred food grade encapsulator is set forth below in the preferred embodiments.

The food grade coloring agents or dyes must have the ability to yield a solid black, grayish black, brown black, or other black color combination where black is the visually dominant color or alternatively, yield a reddish color where red is the visually dominant color. The dyes must be stable at temperatures between about −10° C. to 80° C., and must be light stable.

The food grade coloring agents or dyes consist of the following components, taken either separately or in various combinations: natural or synthetic, non-animal or animal origin water soluble food grade/edible coloring materials in form of extract, tincture, juice, liquid, or powder, or paste, or their combinations, whether or not containing alcohol. The preferred coloring agents are set forth below in the preferred embodiments.

The food grade flavoring agents included in the aqueous solution may be either water or oil soluble and must be light and temperature stable from between about −10° C. to 80° C. and must have the flavor of fish. The food grade flavoring agents are comprised of the following components taken either separately or in various combinations: fish oil extracted or derived from single marine species or mixture of fish oils derived from multiple marine species, sea or land vegetable extracts, juices, natural or artificial flavor enhancers or flavor boosters, natural or artificial aromatic chemicals, essences, to imitate the taste and smell of seafood. The preferred food grade flavoring agents are set forth below in the preferred embodiments.

The food grade sodium chloride included in the aqueous solution is either of the following components taken separately or in various combinations: food grade sea salt, food grade kosher salt, or food grade table salt. The preferred food grade salt is set forth below in the preferred embodiments.

The aqueous solution may include food grade nutrition enhancers, either separately or in combination, such as food grade proteins, food grade vitamins, food grade antioxidants, food grade carotens, food grade amino acids, food grade isoflavonrs, and edible food grade flavonoids. The nutrition enhancers must be temperature stable between about −10° C. and 80° C. and must be light stable.

The aqueous solution is thoroughly mixed to achieve a uniform fish-flavored mixture or solution. The solution is transformed into granules by any conventional means, either separately or in any combination, such as spray drying, spray cooling, liposome entrapment, gel entrapment, rotational suspension separation, casting, extrusion, inclusion, fluid gel technology, uniform droplet generation through harmonically generating nozzles (hydraulic or acoustic), fluid atomization, or any other standard or method allowing the encapsulation of liquid or solid core materials in form of microspheres/granules, where the preferred dimension in any direction of axis is between about 2 millimeters to 4 millimeters. The preferred method of generating granules is set forth below in the preferred embodiments.

Once the granules are formed, it is necessary to create the binding medium or syrup. To a vessel equipped with a mixer, add the granules and add between about 0.01 to 30.0 percent per kilogram of simulated caviar, either separately or in various combinations, ingredients to impart low syneresis, low oxygen permeability, antimicrobial properties, antioxidant properties, moisture-retaining properties, mechanical properties, preservation properties, temperature stability properties, shelf life stability properties, and mouthfeel properties, such as food grade, tannins, polyphenols, catechins, proanthocyanides, and/or quercetins The granules may also be treated with food grade firming agents to improve firmness, mouthfeel, and crispness of the granules where said food grade firming agents comprise between about 0.01 to 20.0 percent per kilogram of simulated caviar of the following components, either taken separately or in various combinations: calcium hydroxide, calcium gluconate, calcium citrate, calcium sulfate, calcium dehydrogen phosphate, calcium hydrogen sulfate, citric acid, potassium gluconate, potassium sulfate, sodium sulfate, sodium bisulfate, magnesium glucontate, aluminum potassium sulfate, alum, aluminum ammonium sulfate, aluminum salts, and magnesium salts.

Food grade stabilizing agents may also be added in the amount of about 0.1%–30.0% per kg of caviar of the following components, taken separately or in various combinations: carboxymethylcellulose, methylcellulose, hydroxypropyl cellulose, xanthan gum, and/or cellulose derivatives.

Food grade sodium chloride may be added to the binding medium or syrup in an amount up to about 5% per kilogram of simulated caviar, either separately or in combination in the form of food grade kosher salt, good grade sea salt, and/or food grade table salt.

Finally, the binding medium or syrup may also include from 0.1% to 10% per kg of simulated caviar, food grade water or oil flavorings as described above. Note, the flavoring used in the preparation of the granule may be different from that used in the preparation of the binding medium or syrup. The granules and binding medium are thoroughly mixed to yield a uniform mixture, where the granules exist in the binding medium or syrup.

Below is a preferred embodiment of the invention.

To a vessel equipped with a mixer is added 1 liter of distilled or filtered water and 70 grams of either food grade pork or beef gelatin where said pork gelatin has a mesh of between about 2 to 100 with a bloom strength of between about 100 to 300, and the beef gelatin has a mesh of between about 2 to 100 and a bloom strength of between about 200–275. The gelatin and water are heated to about 65° C. to completely melt the gelatin. To the melted gelatin mixture is added in any order about 50 grams of food grade coloring agent, about 40 grams of an food grade flavoring agent, and about 20 grams of food grade sea salt. Additionally, about 30 grams water soluble, food grade Vitamin E may be added. The solution is mixed thoroughly until all ingredients are evenly distributed to yield a fish-flavored mixture.

The fish-flavored mixture is transferred into a low-pressure tank equipped with a needle system. The mixture is passed through a needle and introduced, dropwise, into a agitated, heated food grade oil bath, wherein the upper layer of the oil bath is heated to about 60° C. and the bottom layer of the oil bath is kept to between about 10° to 15° C. It is recognized that the oil bath may be vegetable, mineral oil, or paraffin oil.

Maintaining an external pressure of up to about 1 atmosphere and manipulating the distance between the needle and the oil bath aids in the generation of uniform droplets. The droplets yield generally spherically-shaped granules, preferably in the range of between about 2 to 4 millimeters, which form in the bottom of the oil bath. The granules are retrieved from the oil bath and are washed with water, whose temperature does not exceed about 15° C. The resulting granules have a protective outer shell with a gelled center and have similar organoleptic properties to natural sturgeon caviar, in texture, appearance and taste.

To assure the granules' stability, the granules are dipped in an aqueous solution or bath comprising between about 1% to 3% by weight of food grade tannic acid for about 1 to 10 minutes. Afterwards, the granules are washed with water, at a temperature between about 10° C. to 15° C. The tannic acid solution bath imparts temperature stability to the granules similar to that of natural caviar from sturgeon.

Next, the granules are dipped into about a 1% to 3% by weight aqueous food grade alum solution for about 1 to 10 minutes. Subsequently, the granules are washed a second time with water, whose temperature is about 10° to 15° C. to remove the excess alum solution. The alum solution imparts additional crispness and thus a mouthfeel to the granules similar to that of natural caviar from sturgeon.

About 1 kilogram of second washed granules are added a tank equipped with a mixer, along with about 30 grams of food grade flavoring agent having a fish flavor, about 30 grams of food grade sea salt, depending on taste, and about 150 grams of an food grade carboxymethylcellulose stabilizer as a binding medium. The solution is slowly and gently mixed to insure even distribution.

The addition of the salt, flavoring agent and carboxymethylcellulose stabilizer act to insure the flavor, tackiness, viscosity, and flowability of the man-made caviar product. The resulting product is a man-made caviar which exhibits almost identical organoleptic characteristics as that of natural caviar from sturgeon.

An alternative embodiment is found below.

To a vessel equipped with a mixer is added about 1 liter of distilled or filtered water, and about 10 grams of food grade fine mesh Kappa carrageenan. The carrageenan is added slowly while the water is vigorously agitated to avoid lumping. The solution is heated to about 85° C. to completely melt the carrageenan. To the melted aqueous carrageenan mix is added about 50 grams of a food grade coloring agent, about 40 grams of a food grade flavoring agent having the taste of fish and about 20 grams of food grade sea salt. Alternatively, the solution may include about 30 grams of food grade Vitamin E. The solution is mixed thoroughly to yield a fish-flavored mixture, which is transferred to a low-pressure tank equipped with a needle system. The mixture is introduced dropwise into an agitated heated food grade oil bath, wherein the upper layer of the oil is heated to about 85° C. and the bottom layer of the oil bath is kept between about 10° C. to 15° C. Maintaining an external pressure level of about 1 atmosphere and manipulating the distance between the needle and the oil bath aids in the generation of uniform droplets. The droplets form generally spherically shaped granules preferably in the range of between about 2 to 4 millimeters in diameter in the bottom of the vegetable oil bath. The oil is drained and the granules are washed with water, at a temperature which does not exceed about 15° C. It is recognized that the oil may be food grade, vegetable, mineral, or paraffin oil.

About 1 kilogram of granules is added to a vessel equipped with a mixer and to the granules is added about 30 grams of food grade flavoring agent having the taste of fish, about 30 grams of food grade sea salt, and 150 grams of food grade carboxymethylcellulose stabilizer as a binding medium. The mixture is slowly and gently mixed to ensure even distribution. The resulting caviar product includes granules in a binding medium or syrup which exhibits the size, shape, smell, taste, look, feel, tackiness, viscosity and flowability of natural caviar from sturgeon.

The above-described embodiments of the present invention are merely descriptive of its principles and are not to be considered limiting. The scope of the present invention instead shall be determined from the scope of the following claims including their equivalents.

We claim:

1. The process of making a caviar alternative including granules in a syrup, comprising the steps of:

adding about 70 grams of food grade gelatin having a bloom strength of between about 100 to 300 to about 1 liter of water;

heating said water and gelatin to a sufficient temperature to completely melt the gelatin;

adding to the melted gelatin water mixture about 50 grams of food grade coloring agent, about 40 grams of food grade flavoring agent having a fish flavor and about 20 grams of food grade sodium chloride, and mixing until evenly distributed to form a fish-flavored mixture;

forming generally spherically shaped granules having a circumference of between about 2 to 4 millimeters with a protective outer shell and a gelled center from said fish flavored mixture;

dipping said granules into a tannic acid solution comprising water and between about 1.0 to 3.0% by weight food grade tannic acid for between about 1 to 10 minutes;

retrieving said granules from said tannic acid solution and washing said granules with water whose temperature is between about 10° C. to 15° C. to remove any excess tannic acid solution;

dipping said washed granules into an alum solution comprising water and between about 1% to 3% by weight food grade alum for between about 1 to 10 minutes;

retrieving said granules from said alum solution and washing said granules for a second time with water of temperature between about 10° C. to 15° C. to remove any excess alum solution;

adding together about 1 kilogram of said second washed granules, about 30 grams of food grade flavoring agent having a fish flavor, up to about 30 grams of food grade sodium chloride, and about 150 grams of a binding agent selected from a group consisting of food grade methylcellulose or food grade carboxymethylcellulose, and mixing slowly and gently until evenly distributed to complete the caviar alternative product.

2. The process of making a caviar alternative as described in claim 1 wherein the gelatin is food grade pork gelatin having a mesh of between about 2 to 100 with a bloom strength of between about 100 to 300.

3. The process of making a caviar alternative as described in claim 1 wherein the gelatin is food grade beef gelatin having a bloom strength of between about 200 to 275 and a mesh of between about 2–100.

4. The process of making a caviar alternative as described in claim 1 wherein the coloring agent is selected from a group consisting of black food grade coloring agent, red food grade coloring agent, and brown food grade coloring agent.

5. The process of making a caviar alternative as described in claim 1 wherein the flavoring agent is food grade fish oil.

6. The process of making a caviar alternative as described in claim 1 wherein food grade nutrition enhancers are added to the fish-flavored mixture prior to formation of the granule.

7. The process of making a caviar alternative including granules in a syrup, comprising the steps of:

adding about 70 grams of food grade pork gelatin having a mesh of between about 2 to 100 with a bloom strength of between about 100 to 300 to about 1 liter of water;

heating said water and gelatin to about 65° C. long enough to completely melt the gelatin;

adding to the melted gelatin water mixture about 50 grams of food grade coloring agent, about 40 grams of food grade flavoring agent having a fish flavor and about 20 grams of food grade sodium chloride, and mixing until evenly distributed to form a fish-flavored mixture;

passing said fish flavored mixture through the needle of a low pressure tank equipped with a needle dispenser system, while maintaining an external pressure of about 1 atmosphere and introducing said fish flavored mixture dropwise into an agitated, heated food grade oil bath;

the upper layer of said oil bath having a temperature of about 60° C. and the bottom layer of said oil bath having a temperature of between about 10° C. to 15° C.;

said fish flavored mixture forming generally spherically shaped granules having a circumference of between about 2 to 4 millimeters with a protective outer shell and a gelled center in said heated oil bath;

retrieving said granules from said oil bath and washing said granules with water whose temperature is about 15° C. to remove any excess oil;

dipping said first washed granules into a tannic acid solution comprising water and between about 1.0 to 3.0% by weight food grade tannic acid for between about 1 to 10 minutes;

retrieving said granules from said tannic acid solution and washing said granules for a second time with water whose temperature is between about 10° C. to 15° C. to remove any excess tannic acid solution;

dipping said second washed granules into an alum solution comprising water and between about 1% to 3% by weight food grade alum for between about 1 to 10 minutes;

retrieving said granules from said alum solution and washing said granules for a third time with water whose temperature is between about 10° C. to 15° C. to remove any excess alum solution;

adding together about 1 kilogram of third washed granules, about 30 grams of food grade flavoring agent having a fish flavor, up to about 30 grams of food grade sodium chloride, and about 150 grams of a binding agent selected from a group consisting of food grade methylcellulose or food grade carboxymethylcellulose, and mixing slowly and gently until evenly distributed to complete the caviar alternative product.

8. The process of making a caviar alternative as described in claim 7 wherein the oil is selected from a group consisting of a food grade vegetable oil and food grade mineral oil.

9. The process of making a caviar alternative as described in claim 7 wherein the coloring agent is selected from a group consisting of black food grade coloring agent, red food grade coloring agent, and brown food grade coloring agent.

10. The process of making a caviar alternative as described in claim 7 wherein the flavoring agent is food grade fish oil.

11. The process of making a caviar alternative as described in claim 7 wherein food grade nutrition enhancers are added to the fish-flavored mixture prior to formation of the granule.

12. The process of making a caviar alternative including granules in a syrup, comprising the steps of:

adding about 70 grams of food grade beef gelatin having a mesh of between about 2 to 100 with a bloom strength of between about 200 to 275 to about 1 liter of water;

heating said water and gelatin to about 65° C. long enough to completely melt the gelatin;

adding to the melted gelatin water mixture about 50 grams of food grade coloring agent, about 40 grams of food grade flavoring agent having a fish flavor and about 20 grams of food grade sodium chloride, and mixing until evenly distributed to form a fish-flavored mixture;

passing said fish flavored mixture through the needle of a low pressure tank equipped with a needle dispenser system, while maintaining an external pressure of about 1 atmosphere and introducing said fish flavored mixture dropwise into an agitated, heated food grade oil bath;

the upper layer of said oil bath having a temperature of about 60° C. and the bottom layer of said oil bath having a temperature of between about 10° C. to 15° C.;

said fish flavored mixture forming generally spherically shaped granules having a circumference of between about 2 to 4 millimeters with a protective outer shell and a gelled center in said heated oil bath;

retrieving said granules from said oil bath and washing said granules with water whose temperature is about 15° C. to remove any excess oil;

dipping said first washed granules into a tannic acid solution comprising water and between about 1.0 to 3.0% by weight food grade tannic acid for between about 1 to 10 minutes;

retrieving said granules from said tannic acid solution and washing said granules for a second time with water whose temperature is between about 10° C. to 15° C. to remove any excess tannic acid solution;

dipping said second washed granules into an alum solution comprising water and between about 1% to 3% by weight food grade alum for between about 1 to 10 minutes;

retrieving said granules from said alum solution and washing said granules for a third time with water whose temperature is between about 10° C. to 15° C. to remove any excess alum solution;

adding together about 1 kilogram of third washed granules, about 30 grams of food grade flavoring agent having a fish flavor, up to about 30 grams of food grade sodium chloride, and about 150 grams of a binding agent selected from a group consisting of food grade methylcellulose or food grade carboxymethylcellulose, and mixing slowly and gently until evenly distributed to complete the caviar alternative product.

13. The process of making a caviar alternative as described in claim 12 wherein the oil is selected from a group consisting of a food grade vegetable oil and food grade mineral oil.

14. The process of making a caviar alternative as described in claim 12 wherein the coloring agent is selected from a group consisting of black food grade coloring agent, red food grade coloring agent, and brown food grade coloring agent.

15. The process of making a caviar alternative as described in claim 12 wherein the flavoring agent is food grade fish oil.

16. The process of making a caviar alternative as described in claim 12 wherein food grade nutrition enhancers are added to the fish-flavored mixture prior to formation of the granule.

17. The process of making a caviar alternative, including granules in a syrup, comprising the steps of:

slowly adding about 10 grams of food grade fine mesh kappa carrageenan to about 1 liter of filtered and vigorously agitated water;

heating the water and kappa carrageenan to about 85° C. long enough to melt the kappa carrageenan;

adding to the carrageenan water mixture about 50 grams of food grade coloring agent, about 40 grams of food grade flavoring agent having a fish flavor, and about 20 grams of food grade sodium chloride, and mixing until evenly distributed to form a fish-flavored mixture;

forming generally spherically shaped granules having a circumference of between about 2 to 4 millimeters with a protective outer shell and a gelled center from said fish-flavored mixture;

adding together about 1 kilogram of granules, about 30 grams of food grade flavoring agent having a fish flavor, about 30 grams of food grade sodium chloride, and about 150 grams of a binding agent selected from a group consisting of food grade methylcellulose or food grade caboxymethylcellulose and mixing slowly and gently until evenly distributed to complete the caviar alternative product.

18. The process of making a caviar alternative as described in claim 17 wherein the flavoring agent is food grade fish oil.

19. The process of making a caviar alternative as described in claim 17 wherein the coloring agent is selected from a group consisting of black food grade coloring agent, red food grade coloring agent, and brown food grade coloring agent.

20. The process of making a caviar alternative as described in claim 17 wherein food grade nutrition enhancers are added to the fish-flavored mixture prior to formation of the granules.

21. The process of making a caviar alternative, including granules in a syrup, comprising the steps of:
slowly adding about 10 grams of food grade fine mesh kappa carrageenan to about 1 liter of filtered and vigorously agitated water;
heating the water and kappa carrageenan to about 85° C. long enough to melt the kappa carrageenan;
adding to the carrageenan water mixture about 50 grams of food grade coloring agent, about 40 grams of food grade flavoring agent having a fish flavor, and about 20 grams of food grade sodium chloride, and mixing until evenly distributed to form a fish-flavored mixture;
passing said fish flavored mixture through the needle of a low pressure tank equipped with a needle dispenser system, while maintaining an external pressure of about 1 atmosphere and introducing said fish flavored mixture dropwise into an agitated, heated food grade oil bath;
the upper layer of said oil bath having a temperature of about 85° C. and the bottom layer of said oil bath having a temperature is between about 10° C. to 15° C.;
said fish flavored mixture forming generally spherically shaped granules having a circumference of between about 2 to 4 millimeters with a protective outer shell and a gelled center in said heated oil bath;
retrieving said granules from said oil bath and washing said granules with water whose temperature is about 15° C. to remove any excess oil;
adding together about 1 kilogram of washed granules, about 30 grams of food grade flavoring agent having the taste of fish, about 30 grams of food grade sodium chloride, and about 150 grams of a binding agent selected from a group consisting of food grade methylcellulose or food grade caboxymethylcellulose and mixing slowly and gently until evenly distributed to complete the caviar alternative product.

22. The process of making a caviar alternative as described in claim 21 wherein the oil is selected from a group consisting of food grade vegetable oil and food grade mineral oil.

23. The process of making a caviar alternative as described in claim 21 wherein the coloring agent is selected from a group consisting of black food grade coloring agent, red food grade coloring agent, and brown food grade coloring agent.

24. The process of making a caviar alternative as described in claim 21 wherein the flavoring agent is fish oil.

25. The process of making a caviar alternative as described in claim 22 herein nutrition enhancers are added to the fish-flavored mixture prior to formation of the granule.

26. The caviar alternative as produced by the process of claim 1.

27. The caviar alternative as produced by the process of claim 2.

28. The caviar alternative as produced by the process of claim 3.

29. The caviar alternative as produced by the process of claim 4.

30. The caviar alternative as produced by the process of claim 5.

31. The caviar alternative as produced by the process of claim 6.

32. The caviar alternative as produced by the process of claim 7.

33. The caviar alternative as produced by the process of claim 8.

34. The caviar alternative as produced by the process of claim 9.

35. The caviar alternative as produced by the process of claim 10.

36. The caviar alternative as produced by the process of claim 11.

37. The caviar alternative as produced by the process of claim 12.

38. The caviar alternative as produced by the process of claim 13.

39. The caviar alternative as produced by the process of claim 14.

40. The caviar alternative as produced by the process of claim 15.

41. The caviar alternative as produced by the process of claim 16.

42. The caviar alternative as produced by the process of claim 17.

43. The caviar alternative as produced by the process of claim 18.

44. The caviar alternative as produced by the process of claim 19.

45. The caviar alternative as produced by the process of claim 20.

46. The caviar alternative as produced by the process of claim 21.

47. The caviar alternative as produced by the process of claim 22.

48. The caviar alternative as produced by the process of claim 23.

49. The caviar alternative as produced by the process of claim 24.

50. The caviar alternative as produced by the process of claim 25.

51. A caviar alternative including granules in a syrup comprising:
granules having an exterior shell with a gelled center;
the gelled center of said granules including a food grade flavoring agent having the flavor of fish, a food grade coloring agent, and a food grade sodium chloride;
the exterior shell of said granules comprising a food grade encapsulator material;
the exterior shell of said granules including a food grade tannic acid residue and a food grade alum residue;
syrup comprising a food grade flavoring agent, food grade sodium chloride and a food grade binding agent selected from a group consisting of food grade carboxymethylcellulose or methylcellulose;
said granules placed in said syrup.

52. A caviar alternative as described in claim 51 wherein said encapsulator material is beef gelatin.

53. A caviar alternative as described in claim 51 wherein said encapsulator material is pork gelatin.

54. A caviar alternative as described in claim 51 wherein said flavoring agent is food grade fish oil.

55. A caviar alternative as described in claim 51 wherein said coloring is selected from a group consisting of food grade red coloring agent or food grade black coloring agent.

56. A caviar alternative as described in claim 51 wherein the granules include food grade nutrition enhancers.

57. A caviar alternative including granules in a syrup comprising:

granules having an exterior shell with a gelled center;

the gelled center of said granules including a food grade flavoring agent having the flavor of fish, a food grade coloring agent, and a food grade sodium chloride;

the exterior shell of said granules comprising food grade Kappa Carrageenan;

syrup comprising a food grade flavoring agent, food grade sodium chloride and a food grade binding agent selected from a group consisting of food grade carboxymethylcellulose or methylcellulose; and said granules placed in said syrup.

58. A caviar alternative as described in claim 57 wherein said flavoring agent is food grade fish oil.

59. A caviar alternative as described in claim 57 wherein said coloring is selected from a group consisting of food grade red coloring agent or food grade black coloring agent.

60. A caviar alternative as described in claim 57 wherein the granules include food grade nutrition enhancers.

* * * * *